United States Patent
Li et al.

(10) Patent No.: US 10,139,680 B2
(45) Date of Patent: Nov. 27, 2018

(54) METHOD OF MANUFACTURING DISPLAY PANEL, DISPLAY PANEL, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wei Li, Beijing (CN); Huiyue Luo, Beijing (CN); Jae Gwan Shin, Beijing (CN); Heyu An, Beijing (CN); Guanchao Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/245,837

(22) Filed: Aug. 24, 2016

(65) Prior Publication Data
US 2017/0192266 A1    Jul. 6, 2017

(30) Foreign Application Priority Data
Jan. 6, 2016    (CN) .......................... 2016 1 0007330

(51) Int. Cl.
*G02F 1/1337*    (2006.01)
*G02F 1/1333*    (2006.01)
*G02F 1/1335*    (2006.01)

(52) U.S. Cl.
CPC ...... *G02F 1/1337* (2013.01); *G02F 1/133351* (2013.01); *G02F 2001/133354* (2013.01)

(58) Field of Classification Search
None
See application file for complete search history.

(56) References Cited

U.S. PATENT DOCUMENTS

| | | | |
|---|---|---|---|
| 8,520,285 B2* | 8/2013 | Fike, III | B32B 37/003 |
| | | | 156/145 |
| 2003/0117573 A1* | 6/2003 | Yi | G02F 1/1333 |
| | | | 349/158 |

(Continued)

FOREIGN PATENT DOCUMENTS

| | | |
|---|---|---|
| CN | 101097334 A | 1/2008 |
| CN | 101211068 A | 7/2008 |

(Continued)

OTHER PUBLICATIONS

Chinese Office Action in Chinese Application No. 201610007330.2, dated Jan. 11, 2018 with English translation.

*Primary Examiner* — Ashok Patel
(74) *Attorney, Agent, or Firm* — Collard & Roe, P.C.

(57) ABSTRACT

A method of manufacturing a display panel, a display panel, and a display device are disclosed. The method includes: forming an alignment film over an entire surface of an array substrate motherboard, wherein the array substrate motherboard comprises at least one array substrate provided with a pad area on each of the array substrate; cell-assembling the array substrate motherboard with a color filter substrate motherboard to form a display panel motherboard, wherein the color filter substrate motherboard comprises at least one color filter substrate corresponding to the array substrate on the array substrate motherboard; cutting the display panel motherboard to obtain at least one display panel, wherein the display panel comprises the array substrate and the color filter substrate; and removing the alignment film on the pad area.

20 Claims, 4 Drawing Sheets

(56) References Cited

U.S. PATENT DOCUMENTS

| | | | |
|---|---|---|---|
| 2003/0160907 A1* | 8/2003 | Kweon | G02F 1/1309 349/40 |
| 2008/0037104 A1* | 2/2008 | Hagood | G02B 26/0841 359/292 |
| 2008/0043175 A1 | 2/2008 | Jeong et al. | |
| 2014/0057200 A1 | 2/2014 | Lin et al. | |
| 2015/0234222 A1 | 8/2015 | Ma et al. | |
| 2017/0199435 A1 | 7/2017 | Liu et al. | |

FOREIGN PATENT DOCUMENTS

| | | | |
|---|---|---|---|
| CN | 102768439 A | 11/2012 | |
| CN | 103499901 A | 1/2014 | |
| CN | 103838024 A | 6/2014 | |
| CN | 105093693 A | 11/2015 | |
| CN | 105116620 A | 12/2015 | |

\* cited by examiner

METHOD OF MANUFACTURING DISPLAY PANEL, DISPLAY PANEL, AND DISPLAY DEVICE

CROSS REFERENCE TO RELATED APPLICATIONS

Applicant claims priority under 35 U.S.C. § 119 of Chinese Application No. 201610007330.2 filed on Jan. 6, 2016, the disclosure of which is incorporated by reference.

TECHNICAL FIELD

Embodiments of the present disclosure relate to a method of manufacturing a display panel, a display panel, and a display device.

BACKGROUND

Liquid crystal display panels (TFT-LCD), with the advantages of high display quality, low consumption, no radiation, etc., have witnessed significant development over the past years and have been extensively applied in various fields. An existing liquid crystal display panel mainly includes an array substrate, a color filter substrate and liquid crystal layer interposed therebetween. In the process of manufacturing this existing liquid crystal display panel, it may be necessary to coat a layer of an alignment film (for example, a Polyimide film) onto a color filter substrate and an array substrate (a TFT substrate) so as to help display.

SUMMARY

An embodiment of the present disclosure provides a method of manufacturing a display panel, and the method comprises: forming an alignment film over an entire surface of an array substrate motherboard, wherein the array substrate motherboard comprises at least one array substrate provided with a pad area on each of the array substrate; cell-assembling the array substrate motherboard with a color filter substrate motherboard to form a display panel motherboard, wherein the color filter substrate motherboard comprises at least one color filter substrate corresponding to the array substrate on the array substrate motherboard; cutting the display panel motherboard to obtain at least one display panel, wherein the display panel comprises the array substrate and the color filter substrate; and removing the alignment film on the pad area.

Another embodiment of the present disclosure provides a display panel, which is manufactured by the above-mentioned method.

Still another embodiment of the present disclosure provides a display device, comprising the above-mentioned display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
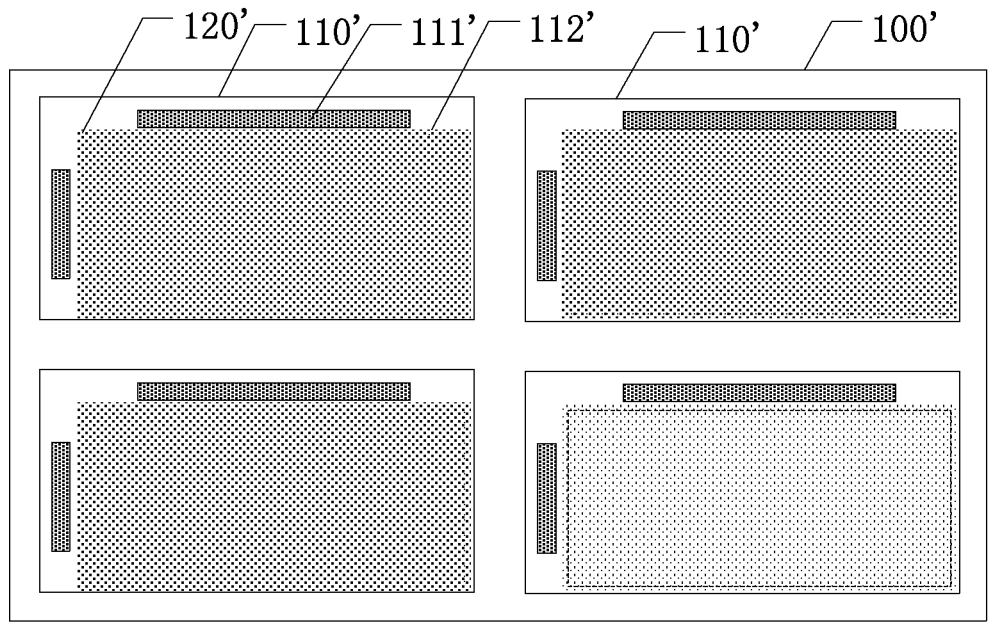
FIG. 1 is a schematic view of preparing an alignment film on an array substrate motherboard.

FIG. 1 is a schematic view of manufacturing an alignment film on an array substrate motherboard. The array substrate motherboard 100' comprises a plurality of array substrates 110', each of which comprises a pad area 111' located in the periphery of the array substrate and a display area 112' (the area within the dashed line frame). The alignment film 120' on each array substrate is formed separately by means of coating. With the development of liquid crystal display technology, the demand for narrow border/frame TFT-LCD products becomes increasingly great. However, narrow border technology requires a smaller edge margin of an alignment film; the narrower the border, the more easily the alignment film is coated onto the pad area located in the periphery of the array substrate, and therefore the alignment film coated onto the pad area will lead to abnormal display and abnormal module bonding during a cell test. Meanwhile, the alignment film prepared in the current method will produce a halo area at the edge thereof; the smaller the edge margin of the alignment film, the closer the edge of the alignment film made to the display area, which may readily lead to a poor panel periphery.

An embodiment of the present disclosure provides a method of manufacturing a display panel, comprising the following operation.

An alignment film is provided (e.g., coated) over an entire surface of an array substrate motherboard, the array substrate motherboard comprising at least one array substrate, each of which is provided with a pad area; the array substrate motherboard is cell-assembled with a color filter substrate motherboard to form a display panel motherboard, and the color filter substrate motherboard comprises a color filter substrate corresponding to the array substrate on the array substrate motherboard; the display panel motherboard is cut to form an individual display panel or display panels; and the alignment film on the pad area is removed. An individual display panel includes an array substrate from the array substrate motherboard and a color filter substrate from the color filter substrate motherboard.

The embodiment of the present application provides a method of manufacturing a display panel, comprising forming an alignment film over an entire surface of an array substrate motherboard such that, even if a halo edge area of the alignment film is formed, the halo edge area of the alignment film formed can be farther away from the display area of the array substrate, and then removing the alignment film on the pad area of the array substrate. In this way, poor display in the periphery of the display panel caused by the halo edge area of the alignment film can be avoided, and the abnormal display and abnormal module bonding during a cell test caused by the pad area covered by the alignment film can also be avoided.

In the method of manufacturing a display panel according to the embodiments of the present disclosure, the operation of removing the alignment film on the pad area can be performed prior to the cell-assembling or subsequent to the cutting.

Figure 2:
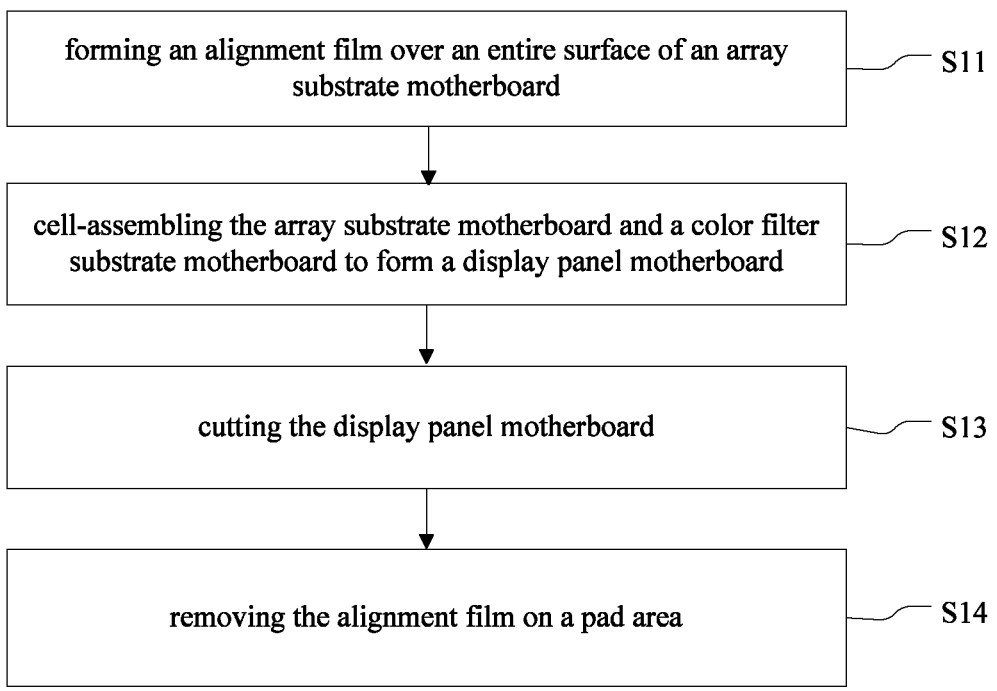
FIG. 2 is a flow chart of a method of manufacturing a display panel according to an embodiment of the disclosure.

Referring to FIG. 2, which is a flow chart of a method of manufacturing a display panel according to an embodiment of the disclosure, the method of manufacturing comprises the following operations S11-S14.

S11: an alignment film is formed over an entire surface of an array substrate motherboard, the array substrate motherboard comprising at least one array substrate, each of which is provided with a pad area.

Figure 3:
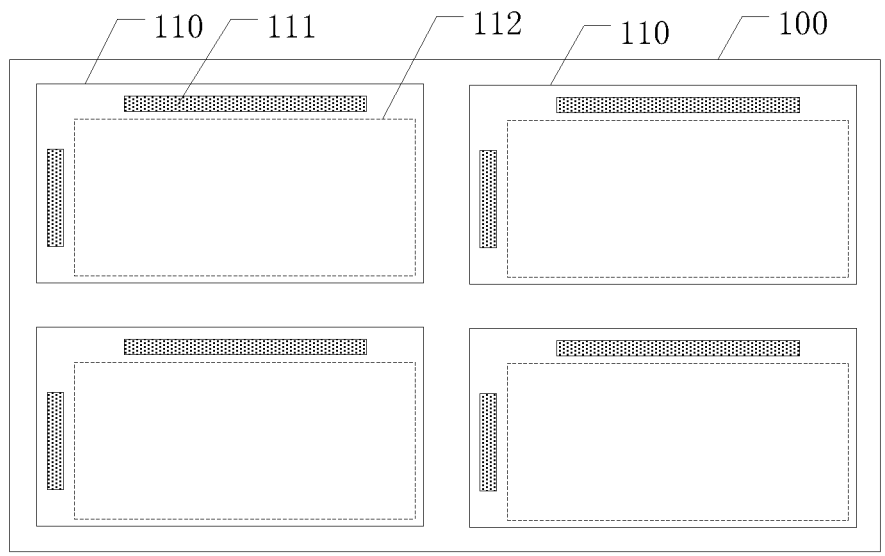
FIGS. 3-6 are schematic views of manufacturing a display panel according to an embodiment of the disclosure.
Figure 4:
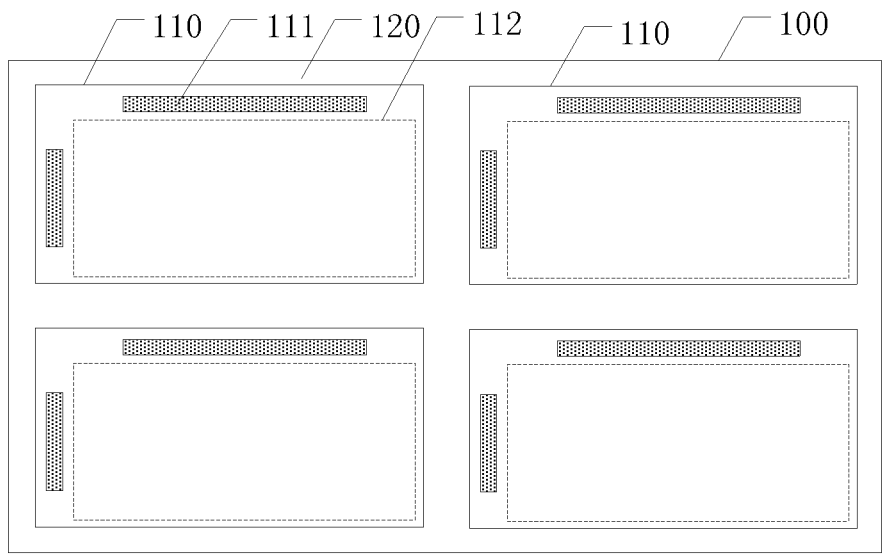

For example, as for the array substrate motherboard as illustrated in FIG. 3, a plurality of array substrates (TFT substrates) 110 are formed thereon, each of which is provided with a display area (the area within the dashed line frame 112) and a pad area 111. If an alignment film is coated on the array substrate motherboard, it is unnecessary to control the pattern and edge margin of the alignment film, but necessary to coat an alignment liquid over an entire surface of the array substrate motherboard by way of full coating, i.e., to coat an alignment liquid over an entire surface of the array substrate motherboard and then to perform a curing (including pre-curing and primary curing) process. As illustrated in FIG. 4, an alignment film 120 is prepared over the entire surface of the array substrate motherboard. As can be seen from FIG. 4, because the alignment film 120 is formed over the entire surface of the array substrate motherboard, its edge is at a bigger distance away from the display area of each array substrate, and even if a halo area is produced at the edge of the alignment film during the curing process, no adverse impact will be produced on the display area. The alignment liquid for coating to form the alignment film is, for example, polyimide (PI).

S12: the array substrate motherboard after Step S11 is cell-assembled with a color filter substrate motherboard to form a display panel motherboard, the color filter substrate motherboard comprising a color filter substrate (a CF substrate) corresponding to the array substrate on the array substrate motherboard.

During the cell-assembling process, for example, a sealing agent (sealant) pattern corresponding to each array substrate may be first formed on the array substrate motherboard, the sealing agent enclosure pattern is provided with a liquid crystal material (e.g., the liquid crystal material is dropped onto the array substrate motherboard), and then the color filter substrate motherboard is laminated on the array substrate motherboard and supported on the color filter substrate motherboard by the sealing agent pattern and spacers (post spacers or dot spacers also provided between the two motherboards) with the liquid crystal material being kept therebetween for forming liquid crystal cells, and then the sealing agent is cured to obtain liquid crystal cells each corresponding to a display panel.

The alignment film on the color filter substrate motherboard can also be formed by the same coating manner over the entire surface of the color filter substrate motherboard as Step S11.

Figure 5:
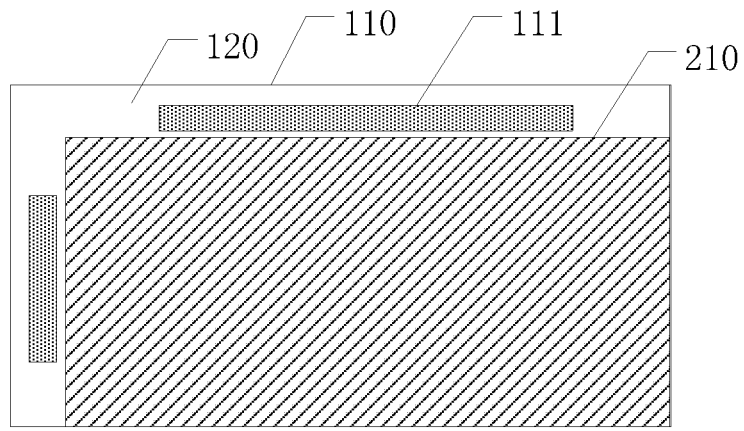

S13: the display panel motherboard is cut to form a plurality of display panels, each of which comprises an array substrate on the array substrate motherboard and a color filter substrate on the color filter substrate motherboard; each display panel after cutting is as illustrated in FIG. 5; after cutting, the alignment film on the pad area 11 on each array substrate 110 is exposed.

S14: the alignment film on the pad area is removed.

Figure 6:
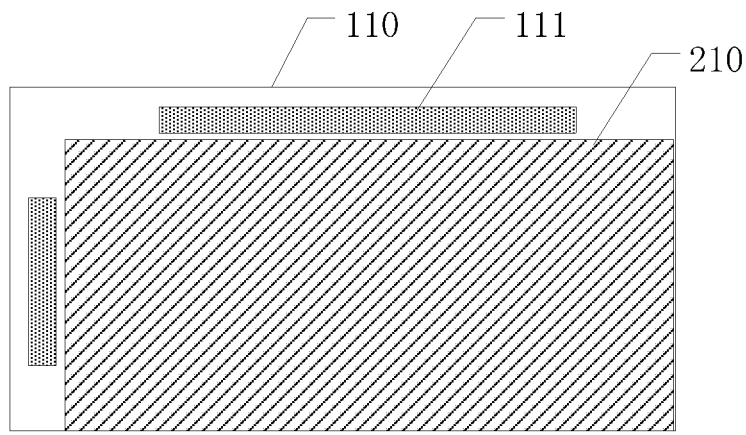

After the cutting operation in S13, the alignment film of the pad area on each array substrate is exposed and the alignment film on the display area is still covered by the color filter substrate. Therefore, regarding each array substrate, the color filter substrate thereon is used as a mask (protection layer) so as to remove the alignment film on the pad area as illustrated in FIG. 6.

Figure 7:
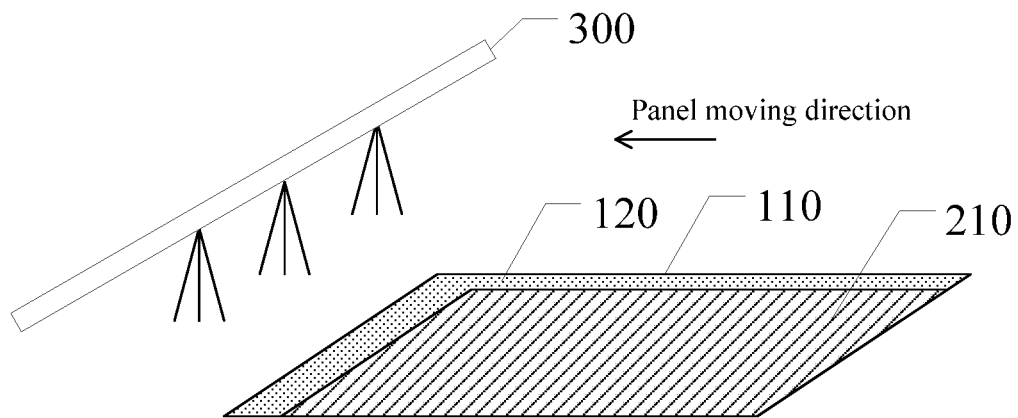
FIG. 7 is a schematic view of removing an alignment film on a pad area by a wet etching process according to an embodiment of the disclosure.

For example, the alignment film on the pad area can be removed by a wet etching process. Specifically, as illustrated in FIG. 7, the display panel formed after cutting is placed under a spraying apparatus 300, where the display panel is controlled for movement passing the spraying apparatus 300 while the spraying apparatus 300 sprays a stripping agent to the display panel so as to remove the alignment film exposed at positions. Preferably, the temperature employed for the wet etching process can range from 60 degrees Celsius to 70 degrees Celsius, for example, in the case of 65 degrees Celsius, the alignment film on the pad area can be removed after 5 minutes, and the display panel is then subjected to water washing and drying.

Besides, the alignment film on the pad area can be removed by a dry etching process as well; in a dray etching process, the reaction gas employed for the dry etching process can be an oxidative gas, which may comprise at least one selected from the group consisting of sulfur hexafluoride ($SF_6$) and oxygen ($O_2$), for example, under the environment of vacuum, the alignment film on the pad area can be removed after 50 minutes under the action of the above gases.

Figure 9:
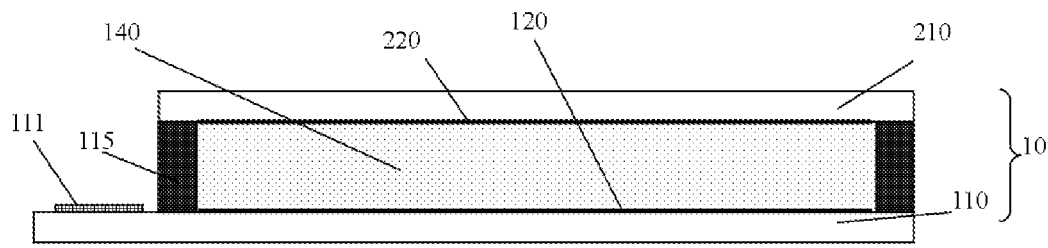
FIG. 9 is a cross-sectional schematic view of a display panel after processing.

FIG. 9 illustrates a cross-sectional schematic view of a display panel after processing. As illustrated in the figure, the array substrate 110 and the color filter substrate 210 are provided opposite to each other, and are fixed to each other via a sealing agent 115 to form a liquid crystal cell; a liquid crystal material 140 is filled in the liquid crystal cell. Alignment films 120 and 220 are respectively coated on the opposite surfaces of the array substrate 110 and the color filter substrate 210. A pad area 111 is provided on one side of the array substrate, where the alignment film in the pad area 11 has been removed as described above.

The method of manufacturing a display panel according to the embodiment of the present disclosure comprises forming an alignment film over the entire surface of the array substrate motherboard such that, even if a halo edge area of the alignment film is formed, the halo edge area of the alignment film formed can be farther away from the display area of the array substrate, and then removing the alignment film on the array substrate pad area. In this way, poor display in the periphery of the panel caused by the halo edge area of the alignment film can be avoided, and the abnormal display and abnormal module bonding during a cell test caused by covering the pad area with the alignment film can also be avoided. In addition, by removing the alignment film on the pad area after cutting, the alignment film on the pad area during the cutting process can further serve to protect and prevent the glass debris produced during cutting from polluting and destroying the circuits or electrodes in the pad area and to improve cutting yield.

Figure 8:
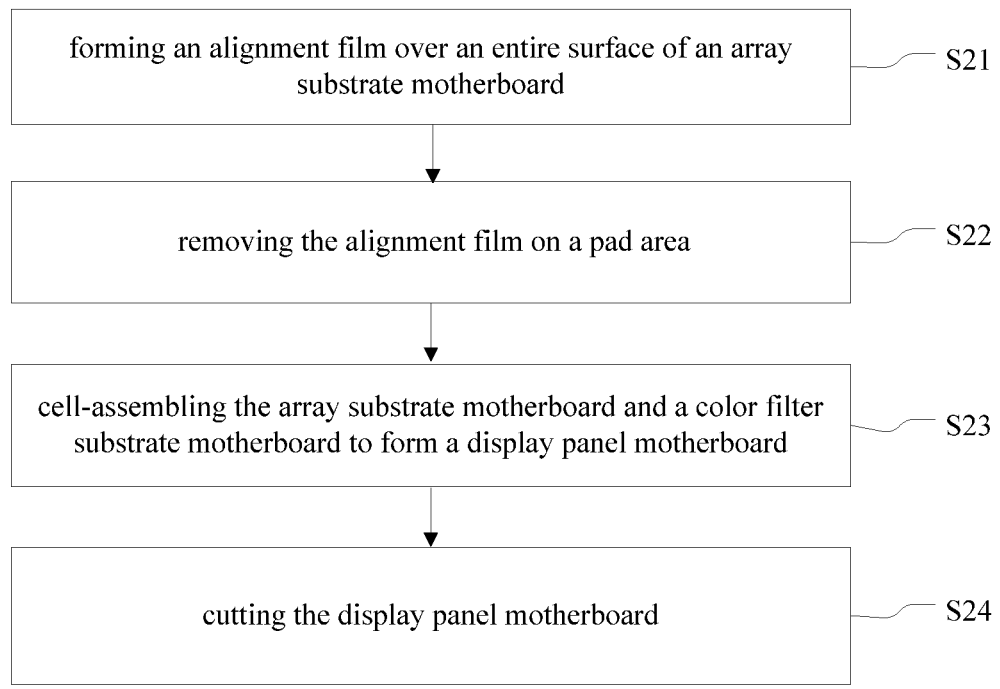
FIG. 8 is a flow chart of another method of manufacturing a display panel according to an embodiment of the disclosure.

Referring to FIG. 8, a flow chart of another method of manufacturing a display panel according to embodiments of the disclosure is illustrated, the method of manufacturing comprises the following operations S21-S24:

S21: forming an alignment film over the entire surface of the array substrate motherboard, the array substrate motherboard comprising at least one array substrate, each of which is provided with a pad area.

The operation S21 can be the same as the above Step S11, and no details will be repeated here.

S22: removing the alignment film on the pad area, for example, the alignment film on the pad area can be removed by a patterning process, which step may specifically comprise the following operations S221-S222.

S221: forming a photoresist pattern on the array substrate motherboard, the photoresist pattern comprising a photoresist removed area and a photoresist reserved area, the photoresist removed area corresponding to the pad area.

For example, a photoresist layer can be coated over an entire surface of the array substrate motherboard, which is then exposed to light through a mask, the area exposed corresponds to the pad area on the array substrate, and a developing process is further performed to remove the photoresist that has been exposed so as to form the desired photoresist pattern with the photoresist removed area and the photoresist reserved area.

S222: removing the photoresist pattern after removing the alignment film in the photoresist removed area.

The process employed for removing the alignment film in the step S222 can be the same as the above Step S14, and no details will be repeated here.

S23: cell-assembling the array substrate motherboard with a color filter substrate motherboard to form a display panel motherboard, the color filter substrate motherboard comprising a color filter substrate corresponding to the array substrate on the array substrate motherboard.

The alignment film on the color filter substrate motherboard can also be formed by the coating manner over an entire surface.

S24: cutting the display panel motherboard so as to form a plurality of display panels.

In addition, the embodiments of the present disclosure further provide a display panel, manufactured by any of the above methods.

Embodiments of the present disclosure further provide a display device, comprising any one of the above-described display panels. The display devices provided in the embodiments of the present disclosure can be any product or component with display function such as a laptop screen, a liquid crystal display, a liquid crystal TV set, a digital photo frame, a mobile phone, a tablet computer, or the like.

What are described above is related to the illustrative embodiments of the disclosure only and not limitative to the scope of the disclosure; the scopes of the disclosure are defined by the accompanying claims.

The application claims priority to the Chinese patent application No. 201610007330.2, filed Jan. 6, 2016, the entire disclosure of which is incorporated herein by reference as part of the present application.

What is claimed is:

1. A method of manufacturing a display panel, comprising:

forming an alignment film over an entire surface of an array substrate motherboard, wherein the array substrate motherboard comprises at least one array substrate provided with a pad area on each of the array substrate;

cell-assembling the array substrate motherboard with a color filter substrate motherboard to form a display panel motherboard, wherein the color filter substrate motherboard comprises at least one color filter substrate corresponding to the array substrate on the array substrate motherboard;

cutting the display panel motherboard to obtain at least one display panel, wherein the display panel comprises the array substrate and the color filter substrate, and the pad area of the array substrate is exposed from the color filter substrate; and removing the alignment film on the pad area.

2. The method of manufacturing a display panel according to claim 1, wherein the removing the alignment film on the pad area is conducted subsequent to the cutting.

3. The method of manufacturing a display panel according to claim 2, wherein following the cutting, the alignment film on the pad area of the array substrate of the display panel is exposed, and the color filter substrate of the display panel is used as a mask to remove the alignment film on the pad area of the array substrate.

4. The method of manufacturing a display panel according to claim 3, wherein the alignment film on the pad area is removed by a wet etching process.

5. The method of manufacturing a display panel according to claim 4, wherein the temperature employed for the wet etching process ranges from 60 degrees Celsius to 70 degrees Celsius.

6. The method of manufacturing a display panel according to claim 3, wherein the alignment film on the pad area is removed by a dry etching process.

7. The method of manufacturing a display panel according to claim 6, wherein the reaction gas employed for the dry etching process comprises at least one selected from the group consisting of sulfur hexafluoride and oxygen.

8. The method of manufacturing a display panel according to claim 1, wherein the array substrate motherboard comprises a plurality of array substrates.

9. The method of manufacturing a display panel according to claim 1, wherein operation of removing the alignment film on the pad area is conducting prior to the cell-assembling.

10. The method of manufacturing a display panel according to claim 9, wherein a photoresist pattern is formed on the array substrate motherboard, the photoresist pattern comprising a photoresist removed area and a photoresist reserved area, the photoresist removed area being corresponding to the pad area;

the alignment film in the pad area is removed by using the photoresist pattern; and the photoresist pattern is removed after removing the alignment film in the photoresist removed area.

11. The method of manufacturing a display panel according to claim 10, wherein the alignment film on the pad area is removed by a wet etching process.

12. The method of manufacturing a display panel according to claim 11, wherein the temperature employed for the wet etching process ranges from 60 degrees Celsius to 70 degrees Celsius.

13. The method of manufacturing a display panel according to claim 10, wherein the alignment film on the pad area is removed by a dry etching process.

14. The method of manufacturing a display panel according to claim 13, wherein the reaction gas employed for the dry etching process comprises at least one selected from the group consisting of sulfur hexafluoride and oxygen.

15. The method of manufacturing a display panel according to claim 1, wherein the alignment film on the pad area is removed by a wet etching process.

16. The method of manufacturing a display panel according to claim 15, wherein the temperature employed for the wet etching process ranges from 60 degrees Celsius to 70 degrees Celsius.

17. The method of manufacturing a display panel according to claim 1, wherein the alignment film on the pad area is removed by a dry etching process.

18. The method of manufacturing a display panel according to claim 17, wherein the reaction gas employed for the dry etching process comprises at least one selected from the group consisting of sulfur hexafluoride and oxygen.

19. A display panel, manufactured by the method according to claim 1.

20. A display device, comprising the display panel according to claim 19.

* * * * *